(12) United States Patent
Schoelkopf et al.

(10) Patent No.: US 7,421,115 B2
(45) Date of Patent: *Sep. 2, 2008

(54) INTERACTIVE IMAGES

(75) Inventors: Bernhard Schoelkopf, Cambridge (GB); Kentaro Toyama, Redmond, WA (US); Matthew Uyttendaele, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 665 days.

This patent is subject to a terminal disclaimer.

(21) Appl. No.: 11/020,943

(22) Filed: Dec. 22, 2004

(65) Prior Publication Data
US 2005/0104966 A1 May 19, 2005

Related U.S. Application Data

(62) Division of application No. 10/012,001, filed on Nov. 30, 2001, now Pat. No. 7,120,293.

(51) Int. Cl.
*G06K 9/00* (2006.01)
*G06F 17/00* (2006.01)
*G06T 1/00* (2006.01)

(52) U.S. Cl. .................... 382/162; 345/418

(58) Field of Classification Search ........... 382/162, 382/164, 165, 214, 276, 284; 345/156, 157, 345/163, 173, 174, 418–420, 611, 751, 763, 345/802; 348/207.11, 207.99; 705/14, 37; 707/9, 10; 709/207; 710/304; 715/177
See application file for complete search history.

(56) References Cited

U.S. PATENT DOCUMENTS

| 4,645,459 | A | * | 2/1987 | Graf et al. ............ 434/43 |
| 4,835,532 | A | * | 5/1989 | Fant ............... 345/611 |
| 5,524,188 | A | * | 6/1996 | Halpern ............ 345/420 |
| 2005/0104966 | A1 | * | 5/2005 | Schoelkopf et al. .... 348/207.11 |
| 2005/0104969 | A1 | * | 5/2005 | Schoelkopf et al. .... 348/207.99 |
| 2006/0133667 | A1 | * | 6/2006 | Schoelkopf et al. ........ 382/162 |

* cited by examiner

*Primary Examiner*—Amir Alavi
(74) *Attorney, Agent, or Firm*—Lyon & Harr, LLP; Richard T. Lyon

(57) ABSTRACT

A system and process for creating an interactive digital image, which allows a viewer to interact with a displayed image so as to change it with regard to a desired effect, such as exposure, focus or color, among others. An interactive image includes representative images which depict a scene with some image parameter varying between them. The interactive image also includes an index image, whose pixels each identify the representative image that exhibits the desired effect related to the varied image parameter at a corresponding pixel location. For example, a pixel of the index image might identify the representative image having a correspondingly-located pixel that depicts a portion of the scene at the sharpest focus. One primary form of interaction involves selecting a pixel of a displayed image whereupon the representative image identified in the index image at a corresponding pixel location is displayed in lieu of the currently displayed image.

4 Claims, 14 Drawing Sheets
(3 of 14 Drawing Sheet(s) Filed in Color)

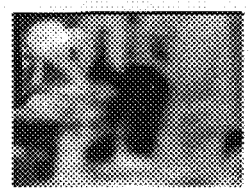 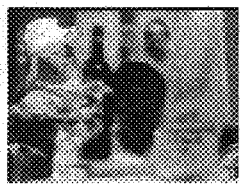 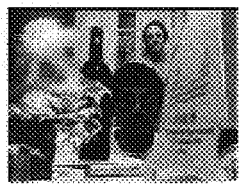 
FIG. 11(a)　　　FIG. 11(b)　　　FIG. 11(c)　　　FIG. 11(d)
 
FIG. 12(a)　　　　　　　　FIG. 12(b)
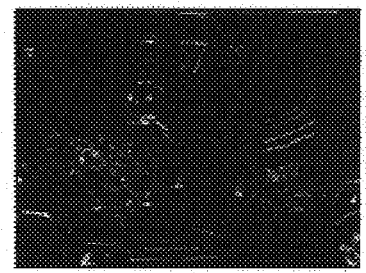
FIG. 13
 
FIG. 14　　　　　　　　FIG. 15

INTERACTIVE IMAGES

CROSS-REFERENCE TO RELATED APPLICATIONS

This application is a divisional of a prior application entitled "INTERACTIVE IMAGES" which was assigned Ser. No. 10/012,001 and filed Nov. 30, 2001, now U.S. Pat. No. 7,120,293.

BACKGROUND

1. Technical Field

The invention is related to the manipulation of digital images which are displayed on a display screen, where the term "digital images" refers to digital photographs, digital video, panoramas, 3D virtual environments, and any other type of digital imagery. More particularly, the invention is a system and process for creating an interactive image that allows a viewer to interact with a displayed image thereof so as to cause the displayed image to change with regard to a desired effect such as exposure, focus and color.

2. Background Art

Technological progress in digital photography is typically measured by how well a digital photograph compares against its analog counterpart. Digital cameras are marketed as being more convenient and less expensive in the long term than analog cameras, but little else. The end goal is still the same—to shoot a still photograph.

Recently, some efforts have been made to do things with digital photography that are difficult or impossible with analog photography. Many digital cameras now come with a capacity to do a "sports shot" or to shoot short video clips. Some digital camera software comes equipped with image-stitching capabilities that allow one to create larger panoramas sewn together from smaller, overlapping images of the same scene. Thus, in addition to static imagery, current digital photography allows the creation of sequential video by capturing a sequence of images of a scene over a period of time, or a panoramic image by capturing a sequence of standard-sized images of a scene at varied pan and/or tilt orientations. However, none of these digital photography techniques can be called interactive. A person viewing the resulting image, panorama or video does just that—views it. This viewer cannot, for instance, interact with the image on a viewing screen to vary the focus or exposure of all or a portion of the image to better discern what is depicted in the image.

Granted, certain handcrafted graphical user interface effects have been incorporated into digital images. For example, some graphics-intensive web pages implement so-called "discoverable" links as a mouseover effect. In these web pages, when a cursor passes over a linked graphical icon, the icon displays itself differently in such a way as to draw the attention of the viewer. While such images might be termed interactive, it is noted that it is the graphical icon the viewer is interacting with, not the image. Further, the construction of an image with discoverable graphical links results in only specific locations being interactive. The user can only interact with the graphical link sites and not any portion of the surrounding image.

SUMMARY

The present invention is directed toward a system and process for creating truly interactive digital images, which will be referred to as interactive images for short. One type of interactive image appears to be a static image when viewed on a PC (or any other display device driven by a processor chip). However, the information in an interactive image may contain many versions of the same scene taken under different camera settings—for example, images of a scene taken with different focus settings such that a first image is an image focused on something near to the camera and a last image of the same scene is an image focused on a far-away object. Thus, an interactive image goes beyond the standard media types of static imagery and sequential video.

Instead of capturing a series of images in which time or pan/tilt parameters are varied (resulting respectively in standard video and panoramas), sequences are captured in which other camera parameters, such as exposure, color saturation or focus, among others, are varied. Such a sequence gives a correspondingly richer representation of the scene captured, and as a result, invites the possibility of richer interaction. Instead of browsing a video by manipulating "forward" and "backward" buttons, an interactive image can be browsed by pointing to different objects in a displayed image, at which point they would for example brighten in contrast or color, or come into focus. In this way a viewer can move through an interactive image in an intuitive manner, by, for example, pointing the cursor at a pixel in the displayed image in an area which he or she is interested in. The interactive image would then respond by changing the displayed image in some prescribed way (e.g., by brightening or coming more sharply into focus in the selected area). These "changes" could be temporary such that they remain only until the cursor is moved to another location, or they could be more permanent such that as each location is selected it changes and remains changed to create a cumulative effect in the displayed image. The former interaction mode is referred to as a pixel-index interaction mode, and the latter is referred to as a cumulative interaction mode.

Other forms of interaction are also possible. For example, a viewer can browse through the individual images making up each interactive image, using for example a slider or joystick, or the like. This interaction mode is referred to as ordinal interaction. The viewer can even elect to combine the component images to create a composite or comprehensive image in a so-called comprehensive interaction mode.

Furthermore, the mechanics of how the user interacts with the image can be accomplished in a variety of ways. For example, instead of using a cursor to select portions of the interactive image via a "mouseover" effect, selection can be made using an eye-gaze tracking device to identify where on the displayed image the viewer is currently looking. The interactive image can also be interacted with not through cursor movement, but through keyboard or voice commands.

In general, an interactive image is created as follows. First, one or more digital images of a scene are captured. Typically, these images will depict the same static scene. In addition, in those cases where more than one image is captured, a prescribed parameter, or set of parameters, is varied in a predetermined manner between images. In other words, the prescribed parameter or parameters will be different for each of the captured images. The parameter or parameters that are varied between images can essentially be any setting that is capable of being varied on a digital camera. For example, in addition to the aforementioned parameters of exposure and focus, the aperture size, brightness, contrast, and white balance, among others, could be varied alone or in combination. It is noted that the input images could also be synthetic images generated via a conventional "virtual camera" program, in which the aforementioned parameters are artificially varied.

In the case where multiple input images exhibiting a varying camera parameter or parameters are employed, ideally, sufficient images should be captured to produce the desired effect. However, this may not be practical. In such a case, additional images are generated using standard interpolative and extrapolative computer graphics and image processing techniques. Essentially, in the case of interpolation these techniques are used to interpolate the prescribed parameter or parameters being varied between input images to generate images having parameter value(s) in-between those of the input images. Whereas, in the case of extrapolation, these techniques are used to extrapolate the prescribed parameter or parameters to generate images having parameter value(s) outside those of the input images. The resulting images are referred to as representative images. In cases where there are sufficient input images to create the desired effect in the interactive image, the input images are designated as the representative images. However, in cases where interpolative and extrapolative techniques are employed to generate additional images from the input images, any subset of the union of input, interpolated, and extrapolated images may be designated as the representative images.

In some cases, representative images are not interpolated from the input images, but rather are extracted from them. It was described above how various camera settings can be varied between images to form the basis for an interactive image. However, the desired effect in an interactive image can also pertain to aspects such as color or resolution. These aspects can be derived from a single input image. It is also possible to employ more than one input image in generating the extracted images such as when a set of input images are first combined to form a single image and then the representative images are created from the combined image.

An interactive image can also include an index image. The index image represents a pixel by pixel link to one of the representative images, by assigning each pixel location to one of the representative images. In those interaction modes in which a viewer interacts with the interactive image by selecting a pixel location, the corresponding pixel location would be identified in the index image and the representative image assigned to that location would be displayed to the viewer. As to which representative image is linked to a particular pixel location of the index image, this will depend on the desired interactive effect. For example, in the case where the desired interactive effect is to display the representative image having the "best" exposure or focus, image processing techniques are employed to determine which of the representative images represents the best exposure level or focus setting in connection with the selected pixel location. The pixel location of the index image corresponding to the selected location is then assigned an indicator specifying which representative image was deemed to have the best exposure or focus for that location. For example, each of the representative images could be assigned an index number and the indicator assigned to the index image would be that index number. The representative image associated with the index number would be displayed.

Neither index images nor all representative images need to be computed and stored as such. The information that would be contained in them can be generated "on the fly" if enough processing power exist. Thus, instead of pre-computing the best link from a single pixel to a representative image in an index image, an interactive image module could compute both the best parameters for a representative image given a pixel and compute the representative image itself online.

In the foregoing examples, the result of the viewer interaction was to display a single representative image. However, other possibilities exist. For example, when the aforementioned interaction modes that produce cumulative or comprehensive displayed images are employed, the resulting image displayed to the viewer is a combination of representative images. In the case of a cumulative interaction mode, the image displayed upon the viewer's first selection of a pixel location is the single representative image assigned to the corresponding location in the index image. When the viewer subsequently selects another location, the representative image associated with that pixel location in the index image is combined with the last displayed image to produce a cumulative image using conventional image processing techniques. This procedure is then repeated each time the viewer selects a pixel location whose corresponding location in the index image identifies a representative image that has not previously been made part of the currently displayed combined image, to create a new, more extensive, cumulative image.

When a viewer requests a comprehensive image, the interactive image system automatically combines the representative images assigned to the index image in such a way that each pixel of the resulting image exhibits an optimal condition related to the parameter or parameters varied among the representative images. For example, the resulting comprehensive image associated with an interactive image where the interactive effect is focus, would be an image where every pixel is shown at the sharpest possible focus.

The interactive image concept can also be extended into digital video and virtual reality applications. Since digital video and virtual reality application involve the display of images, these images can be made interactive, thereby creating an interactive digital video or a more fully interactive virtual reality experience.

To create an interactive video, each frame of the video (or at least some) would be processed in one of the ways described previously to produce an interactive image for each frame that exhibits some desired interactive effect. The viewer can then interact with the video in a variety of ways. For example, the viewer could request the video to be paused so that a single frame is displayed indefinitely. The viewer can then interact with that displayed frame just as with any interactive image. Another form of interaction, akin to the pixel-index mode of interaction described previously, involves the viewer selecting a pixel location in the scene being depicted while the video is running. The particular interactive effect embodied in the video that is associated with the selected location is then created in each frame prior to it being displayed to the viewer until the viewer selects a different location. The previously-described cumulative and comprehensive modes of interaction can also be extended to an interactive video. In the cumulative mode, as the viewer selects new location, the interactive effect associated with the video is realized not just for the selected location as described above, but for all the previously selected locations as well. Thus, each frame of the video displayed is a combination of representative images associated with the frame. This is also the case when the comprehensive mode of interaction is requested, with the exception that the viewer need not select a location in the video display. Rather, all the representative images associated with each frame of the interactive video are automatically combined to produce a comprehensive frame prior to it being display.

As for combining interactive images with virtual reality applications, the virtual reality system would operate normally allowing a viewer to navigate through a virtual scene by changing their viewing position and orientation. However, each virtual image (or at least some) is an interactive image. This allows a viewer to interact with the virtual image as described previously. The interaction may also be directly tied to the 3D browsing user interface. Thus, a user could walk through a 3D interactive virtual scene and find that as the user walks from a virtual outdoor environment to an indoor one, the objects in the indoor environment go from being dark and hard to see to becoming well-lit and easy to see, mimicking the way that the human eye adjusts to corresponding changes in ambient illumination in the real world.

In addition to the just described benefits, other advantages of the present invention will become apparent from the detailed description which follows hereinafter when taken in conjunction with the drawing figures which accompany it.

DESCRIPTION OF THE DRAWINGS

The file of this patent contains at least one drawing executed in color. Copies of this patent with color drawing(s) will be provided by the U.S. Patent and Trademark Office upon request and payment of the necessary fee.

The specific features, aspects, and advantages of the present invention will become better understood with regard to the following description, appended claims, and accompanying drawings where:

FIGS. 11(a)-(d) are images representing 4 of 27 input images of a scene taken at different focus settings.

FIG. 12(a) is an image representing the index image generated using the process of FIGS. 10A-B without pre-processing and post-processing smoothing.

FIG. 12(b) is an image representing the index image generated using the process of FIGS. 10A-B with pre-processing and post-processing smoothing.

FIG. 13 is an image showing the relative maximum contrast values over a set of representative images.

FIG. 14 is an image showing an example of a cumulative image that can be generated using the Hocus Focus interactive image created in accordance with the process of FIGS. 10A-B.

FIG. 15 is an image showing an example of a globally-focused comprehensive image that can be generated using the Hocus Focus interactive image created in accordance with the process of FIGS. 10A-B.

In FIG. 19(a) the viewer has chosen to see, in color, only pixels having the red color associated with some of the flowers, while in FIG. 19(b) the viewer has chosen to see, in color, only pixels having the yellow color associated with some of the flowers.

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

Figure 1:
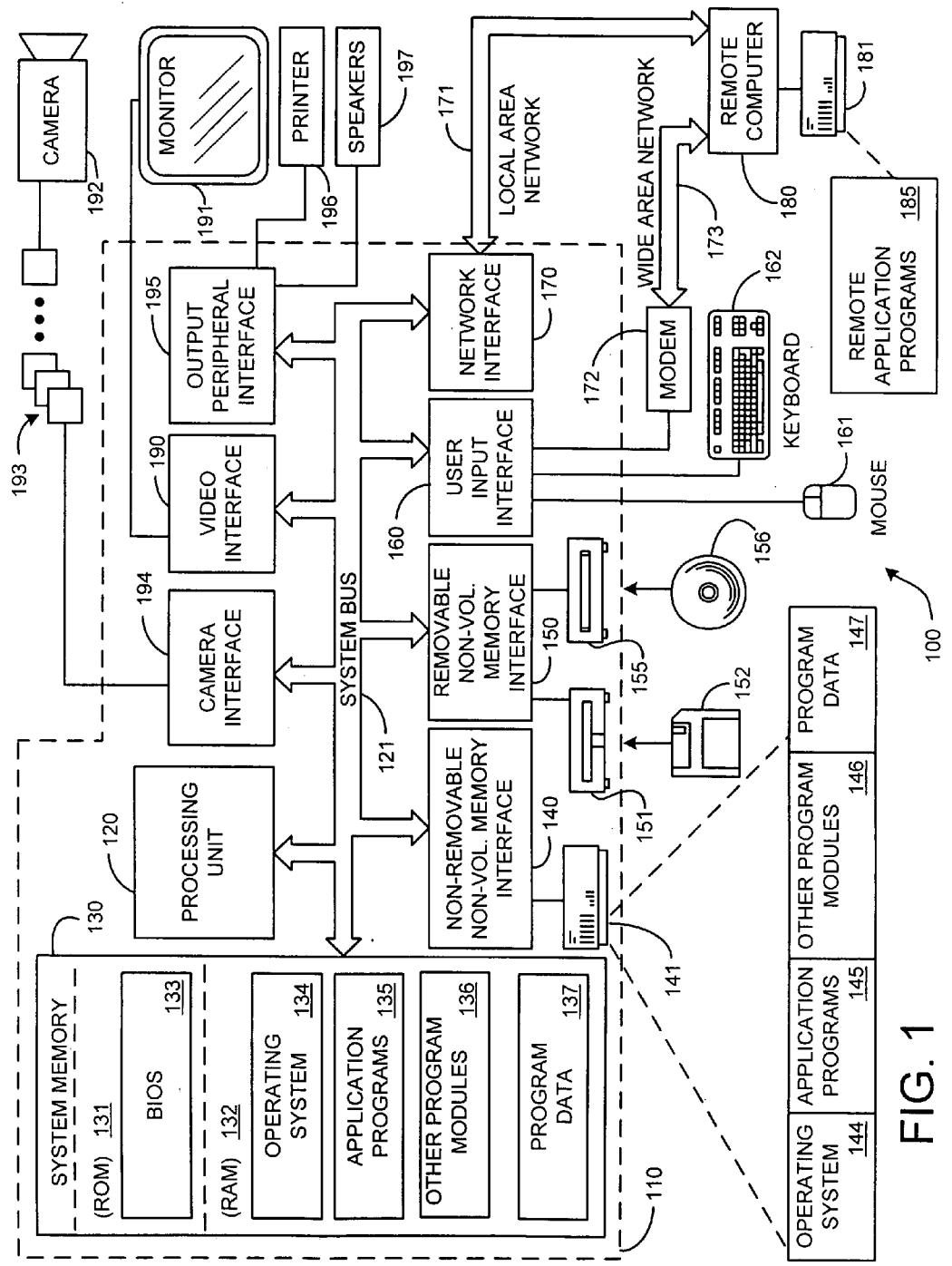
FIG. 1 is a diagram depicting a general purpose computing device constituting an exemplary system for implementing the present invention.

Before providing a description of the preferred embodiments of the present invention, a brief, general description of a suitable computing environment in which the invention may be implemented will be described. FIG. 1 illustrates an example of a suitable computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 163 (such as a digital/electronic still or video camera, or film/photographic scanner) capable of capturing a sequence of images 164 can also be included as an input device to the personal computer 110. Further, while just one camera is depicted, multiple cameras could be included as input devices to the personal computer 110. The images 164 from the one or more cameras are input into the computer 110 via an appropriate camera interface 165. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining part of this description section will be devoted to a description of the interactive image system and associated processes according to the present invention. Generally, an interactive image system allows a viewer to interact with an image displayed on the screen of a computing device, such as described above, so as to cause the displayed image to change in accordance with a an interactive effect embodied in the system. For example, the interactive effect can be that a part of the displayed image changes in regard to its exposure, sharpness of focus, color saturation, aperture size, brightness, contrast, resolution, white balance, and so on. The heart of the interactive image system is the interactive image itself. Its construction is described in detail in the section to follow.

1. Interactive Image Construction

Figure 2:
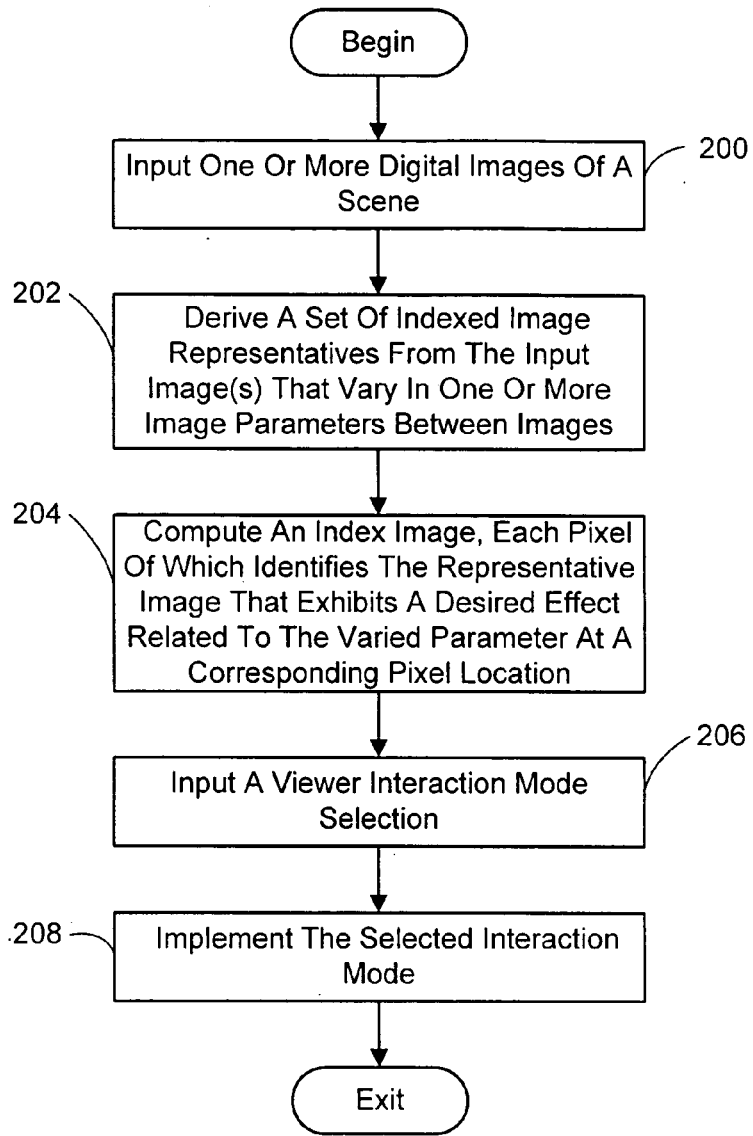
FIG. 2 is a flow chart diagramming an overall process for creating an interactive image that allows a viewer to interact with a displayed image so as to cause the displayed image to change with regard to a desired effect such as exposure, focus and color in accordance with the present invention.

An interactive image is essentially made up of a set of representative images and an index image that correlates one of the representative images to each pixel location of the image displayed to the viewer. In general, an interactive image is created as outlined in the high-level flow diagram of FIG. 2:

a) First, one or more captured or generated digital images of a scene are input into the interactive image system, which in the case of video or virtual environments would be one or more digital instances of each frame or place (process action 200);

b) The aforementioned set of indexed image representatives is then derived from the input image(s), which depict the scene with one or more image parameters (e.g., exposure, sharpness of focus, color saturation, aperture size, brightness, contrast, resolution, white balance, and so on) varying between images (process action 202);

c) The index image is computed next, each pixel of which identifies the representative image that exhibits a desired effect related to the varied parameter (e.g., best exposure, sharpest focus, and so on) at the corresponding pixel location (process action 204).

The following sub-sections described each of these actions in more detail.

1.1 Inputting Images

As mentioned above, one or more digital images of a scene are captured and input into the interactive image system. Typically, these input images $I_i^*$ ($1 \leq i \leq n^*$ where $n^*$ equals the number of input images) will depict the same static scene, although there can be exceptions one of which will be described later. In addition, in those cases where more than one image is captured, a prescribed parameter, or set of parameters, is varied in a predetermined manner between images. In other words, the prescribed parameter or parameters will be different for each of the captured images. The parameter or parameters that are varied between images can essentially be any setting that is capable of being varied on a digital camera. For example, in addition to the aforementioned parameters of exposure and focus, the aperture size, brightness, contrast, and white balance, among others, could be varied alone or in combination.

It is noted that the input images could also be synthetic images generated via a conventional "virtual camera" program. These programs typically have the capability to artificially vary the aforementioned parameters to create the needed input images. In the remainder of this description when the input images or their capture are referred to, it is understood that this means either actual images captured using a digital camera or synthetic images generated via a virtual camera program.

1.2 Deriving the Image Representatives

In a multi-input image embodiment, the number of images captured and the degree to which the prescribed parameter or parameters are varied between images will depend on the effect desired when a viewer interacts with the resulting interactive image. Ideally, sufficient images should be captured to produce the desired effect. However, this may not be practical. For example, consider the case where objects are moving in the scene being captured. If it is desired that the interactive image pertain to a static scene, as is typically the case, it can be very difficult to capture more than just a few images where the objects are all in approximately the same location. However, it is possible to generate additional images using standard interpolative or extrapolative computer graphics and image processing techniques. Essentially, these techniques are used to generate the prescribed parameter or parameters being varied between input images to generate images having parameter value(s) in-between or outside of those of the input images. In this way any number of images can be created from even a limited set of input images. The resulting images are referred to as representative images $I_i$ (for $1 \leq i \leq n$ where $n$ equals the number of representative images). In cases where there are sufficient input images to create the desired effect in the interactive image, the input images are designated as the representative images. However, in cases where interpolative and extrapolative techniques are employed to generate additional images from the input images, any subset of the union of input, interpolated, and extrapolated images may be designated as the representative images.

In some cases, representative images are not interpolated from the input images, but rather are extracted from them. It was described above how various camera settings can be varied between images to form the basis for an interactive image. However, the desired effect in an interactive image can also pertain to aspects such as color or resolution. Aspects such as these can be derived from a single input image. For example, a single color image of the scene can be used to create a set of representative images each of which shows the scene at a particular RGB color combination or range of combinations. Likewise, a single high resolution image of a scene can be used to generate a set of lower resolution images, thereby creating a set of hierarchical representative images starting a high resolution and progressing to relatively lower and lower resolutions. It is also possible to employ more than one input image in generating the extracted images such as when a set of input images is first combined to form a single image, and then the representative images are created from the combined image.

Further, the set of representative images can be a combination of input images exhibiting varying camera settings (including images interpolated therefrom), and images extracted from these images. For example, the input images could exhibit varying exposure levels, and for each input image a series of images showing the scene at a different RGB level could be extracted. Such an extracted image would depict those pixels exhibiting a particular RGB level in that color and the rest of the pixels would be depicted in gray scale. The resulting interactive image could then be designed such that when a viewer selects a particular pixel location, the representative image that shows only those regions of the scene having the color of the selected pixel (or within a range including the color of the selected pixel) and exhibiting the "best" exposure level in connection with the selected pixel location. Of course, this is just one example of the effect that could be produced by the interactive image using the color-exposure combination of representative images. However, this example points out the versatility of the interactive image. Essentially, representative images can be created from any combination of input, interpolated and extracted images, and designed to produce various interactive effects.

1.3 Computing the Index Image

In order to facilitate the interaction between the viewer and the interactive image, a pointer scheme is employed which will be referred to as an index image. Essentially, for every pixel location in the interactive image, the index image contains an indicator specifying one of the representative images. In those interaction modes in which a viewer selects a pixel in a displayed image, the selected pixel location would be identified in the index image and the representative image assigned to that location would be displayed to the viewer. As to which representative image is linked to a particular pixel location of the index image, this will depend on the desired interactive effect. For example, in the case where the desired interactive effect is to display the representative image having the "best" exposure or focus, image processing techniques are employed to determine which of the representative images represents the best exposure level or focus setting in connection with a particular pixel location. The pixel location of the index image corresponding to this location is then assigned an indicator specifying which representative image was deemed to have the best exposure or focus for that location. For example, each of the representative images could be assigned an index number and the indicator assigned to the index image would be that index number. The representative image associated with the index number would be displayed. In the case where the desired interactive effect is some combination of parameters, each pixel of the index image would identify the one representative image that provided the desired combined effect. For instance, in the foregoing example of an interactive image that provides a combined color selection and optimum exposure effect, each pixel of the index image would point to the representative image that is deemed to exhibit the color associated with the selected pixel location and which provides the "best" exposure level in connection with that location.

2. Interaction Modes

An interactive image can be interacted with in a variety of ways, referred to as modes of interaction. These include an ordinal mode, a pixel-index mode, a cumulative mode and a comprehensive mode, each of which will be described in detail below. The interactive image system includes a viewer interface module, which allows a viewer to select an interaction mode, and then implements that mode using the representative images and the index images (as needed). Thus, referring again to FIG. 2, process actions 206 and 208 are to input a viewer interaction mode selection and to implement that mode, respectively. As will become apparent in the description of the modes of interaction, the implementation of a mode of interaction involves displaying a representative image, or a modified or combined version thereof, to the viewer, either automatically (as in the case of the comprehensive mode), or in response to the viewer selection of a particular representative image or a pixel within a displayed image.

2.1 Ordinal Mode

One mode of interaction, dubbed the ordinal mode, uses sliders, joysticks, and so forth as inputs to directly control the indices of the representative image to be displayed. Thus, referring now to FIGS. 3A and 3B, implementing the selected mode of interaction (i.e., action 206 of FIG. 2) includes determining whether the ordinal mode has been selected (process action 300). If so, then the viewer's selection of a particular representative image (via a slider, joystick or some other input means) is input as indicated in process action 302. For example, suppose a conventional graphics user interface (GUI) slider tool is employed. The slider can be set so that when the viewer moves it to the right, the value of the index increases within a range from 1 to the total number of representative images, and when the viewer moves the slider to the left the index value decreases within the range. Once the viewer has selected a representative image, it is displayed (process action 304). Thus, in the foregoing example, the representative image whose index matches the location of the slider is displayed. If it is determined in process action 300 that the ordinal mode has not been selected by the viewer, then it is determined which of the other modes has been chosen. To this end, in process action 306, it is determined if the pixel-index mode has been chosen. If not, then it is determined if the cumulative mode was selected (process action 308). If the cumulative mode was not selected, it is assumed that the comprehensive mode was chosen (process action 310).

2.2 Pixel-Index Mode

The pixel-index mode of interaction involves a viewer using some means (e.g., a conventional input device such as a mouse, keyboard, pointer, or the like) of selecting a pixel of the currently displayed image. For example, a so-called mouseover effect can be implemented where the viewer uses one of the aforementioned input devices to place a cursor over the desired pixel location and then selects that location. Alternately, instead of using a cursor to select portions of the interactive image, selection can be made using an eye-gaze tracking device to identify where on the displayed image the viewer is currently looking. The selection mechanism could even involve the use of voice commands if desired.

Figure 3A:
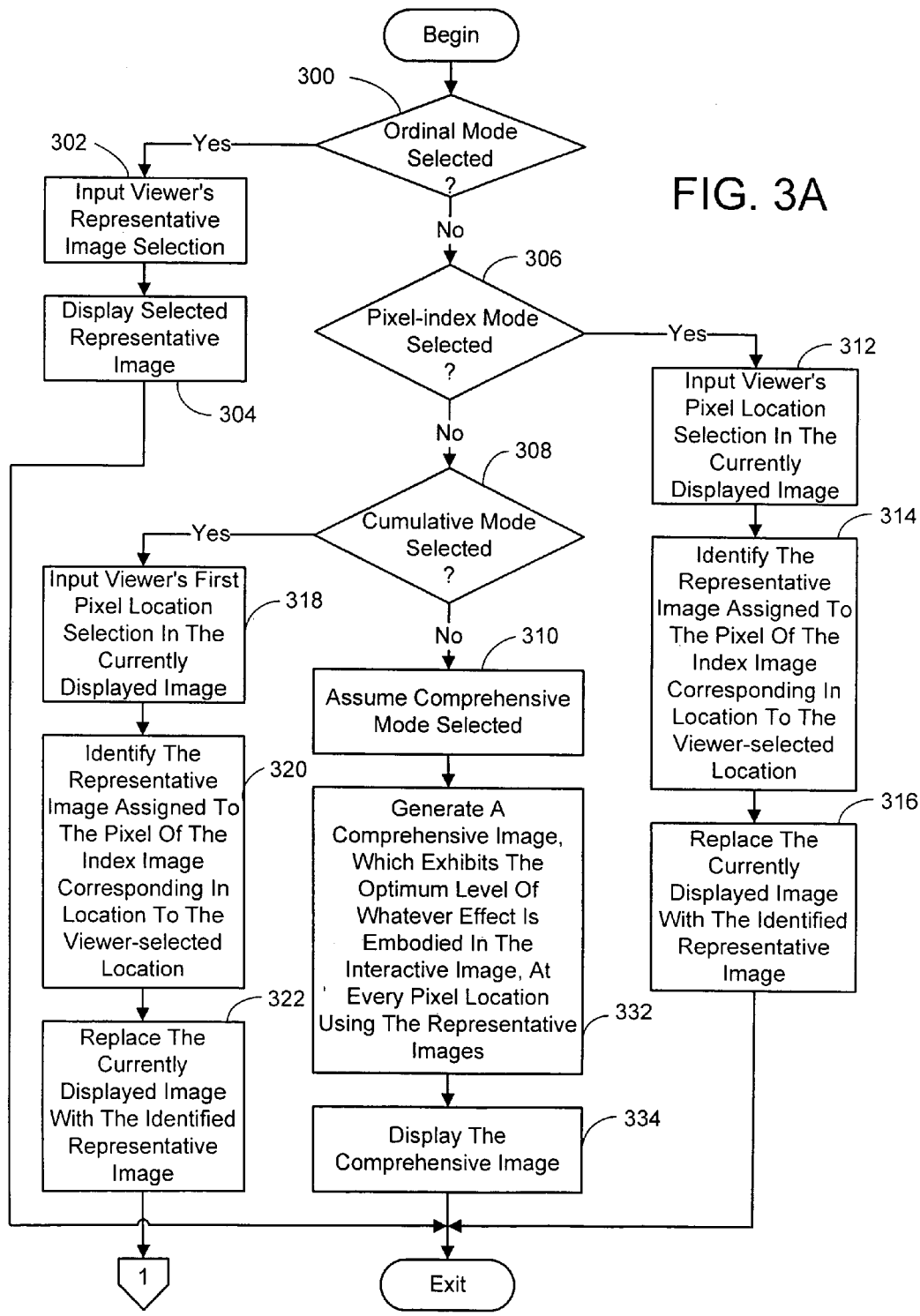
FIGS. 3A-B are a flow chart diagramming a process for accomplishing the interaction mode implementation technique of FIG. 2.

Thus, referring to FIG. 3A, if it is determined in process action 306 that the pixel index mode of interaction has been selected, then the viewer's selection of a pixel location in the currently displayed image is input into the interactive image system (process action 312). In response, the interactive image system identifies the representative image assigned to the pixel location of the index image corresponding in location to the viewer-selected location of the displayed image (process action 314). The currently displayed image is then replaced with the identified representative image (process action 316).

2.3 Cumulative Mode

The cumulative mode of interaction is implemented similar to the pixel-index mode. However, instead of the representative image identified as a result of a viewer selecting a pixel location replacing the previously displayed image, the newly identified image is combined with the displayed image to create a cumulative image. This cumulative image is then displayed to the viewer. In this way new representative images are added to the cumulative image each time the viewer selects a pixel in the displayed image.

Figure 3B:
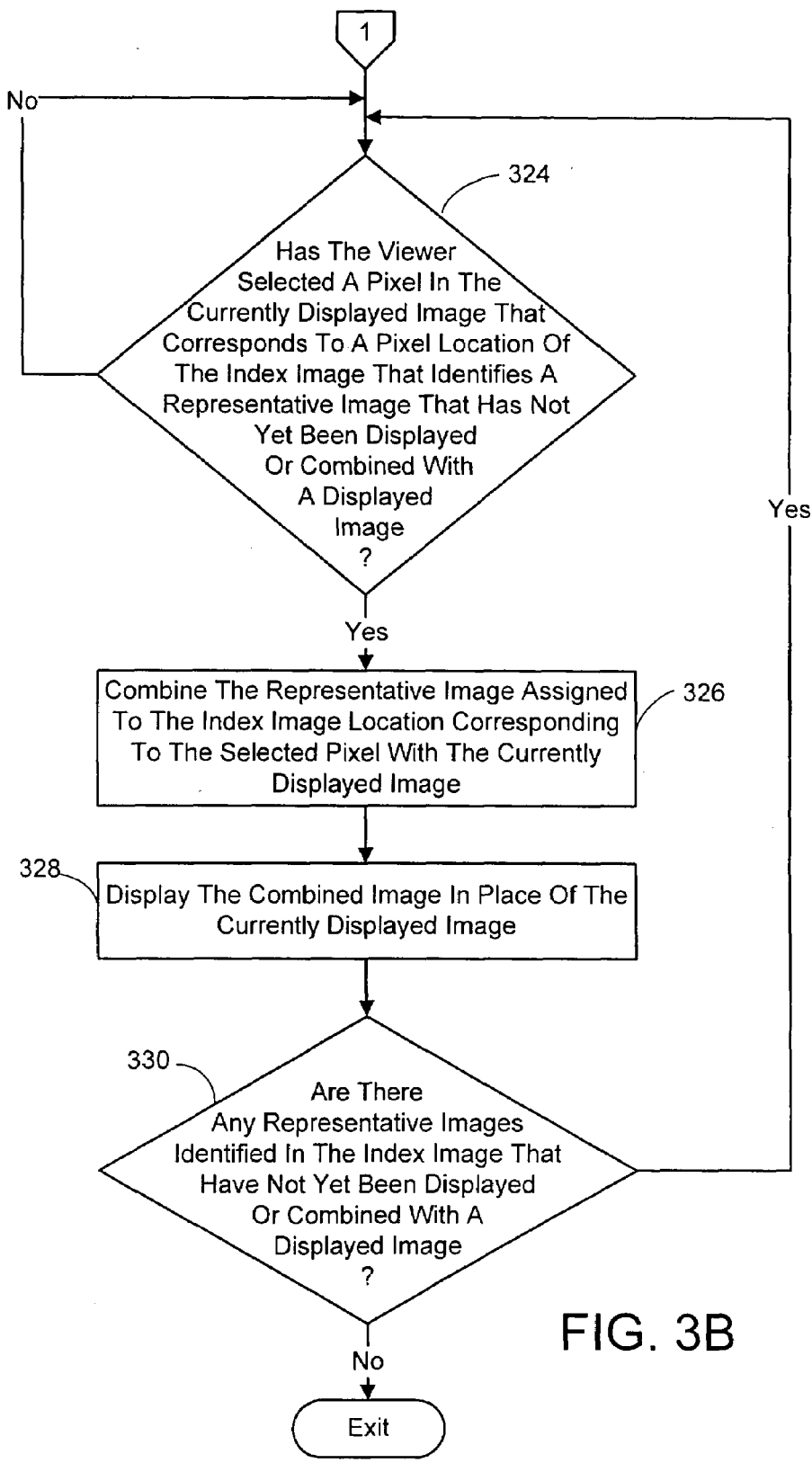

Accordingly, referring to FIG. 3A, if it is determined in process action 308 that the cumulative mode of interaction was selected, then the viewer's first selection of a pixel location in the currently displayed image is input into the interactive image system (process action 318). In response, the interactive image system identifies the representative image assigned to the pixel location of the index image corresponding in location to the first viewer-selected location of the displayed image (process action 320). The currently displayed image is then replaced with the identified representative image (process action 322). Referring now to FIG. 3B, it is next determined if the viewer has subsequently selected a pixel in the currently displayed image that corresponds to a pixel location of the index image that identifies a representative image that has not yet been displayed or combined with a displayed image (process action 324). If so, then the representative image assigned to the index image location corresponding to the selected pixel is combined with the currently displayed image (process action 326), and the new combined image is displayed in place of the currently displayed image (process action 328). If, however, the selected pixel corresponds to a pixel location of the index image that identifies a representative image that has been displayed or combined with a displayed image previously, then process actions 324 through 328 are repeated. It is next determined whether there are any representative images identified in the index image that have not yet been displayed or combined with a displayed image (process action 330). If there are such images, process actions 324 through 330 are repeated until no unselected representative images remain, at which point the process ends.

2.4 Comprehensive Mode

In general, the comprehensive mode of interaction involves the construction of an image that displays some combination of the representative images in a single view. For example, the comprehensive image associated with an interactive image where the interactive effect is focus, would be an image where every pixel is shown at the sharpest possible focus.

Accordingly, referring again to FIG. 3A, whenever it has been assumed that the selected mode of interaction is the comprehensive mode (process action 310), an image that exhibits the optimum level of whatever effect is embodied in the interactive image (e.g., exposure, focus, color, and so on) at every pixel location is automatically generated using the representative images and designated as the comprehensive image (process action 332). This comprehensive image is then displayed to the viewer (process action 334).

3. Interactive Image Examples

In the following sub-sections, examples of the construction and implementation of three different types of interactive images are described. Namely, interactive images involving exposure, focus and color saturation. These examples are presented to further aid in the understanding of the generation of representative images and index images, and the application of the aforementioned interaction modes. It is not intended that the present invention be limited to just these three types of interactive images. Rather, as is apparent from the foregoing description, interactive images are extremely flexible and readily embody any interactive effect that can be varied on a digital camera or extracted from an input image.

3.1 Decent Exposure Interactive Images

Figure 4:
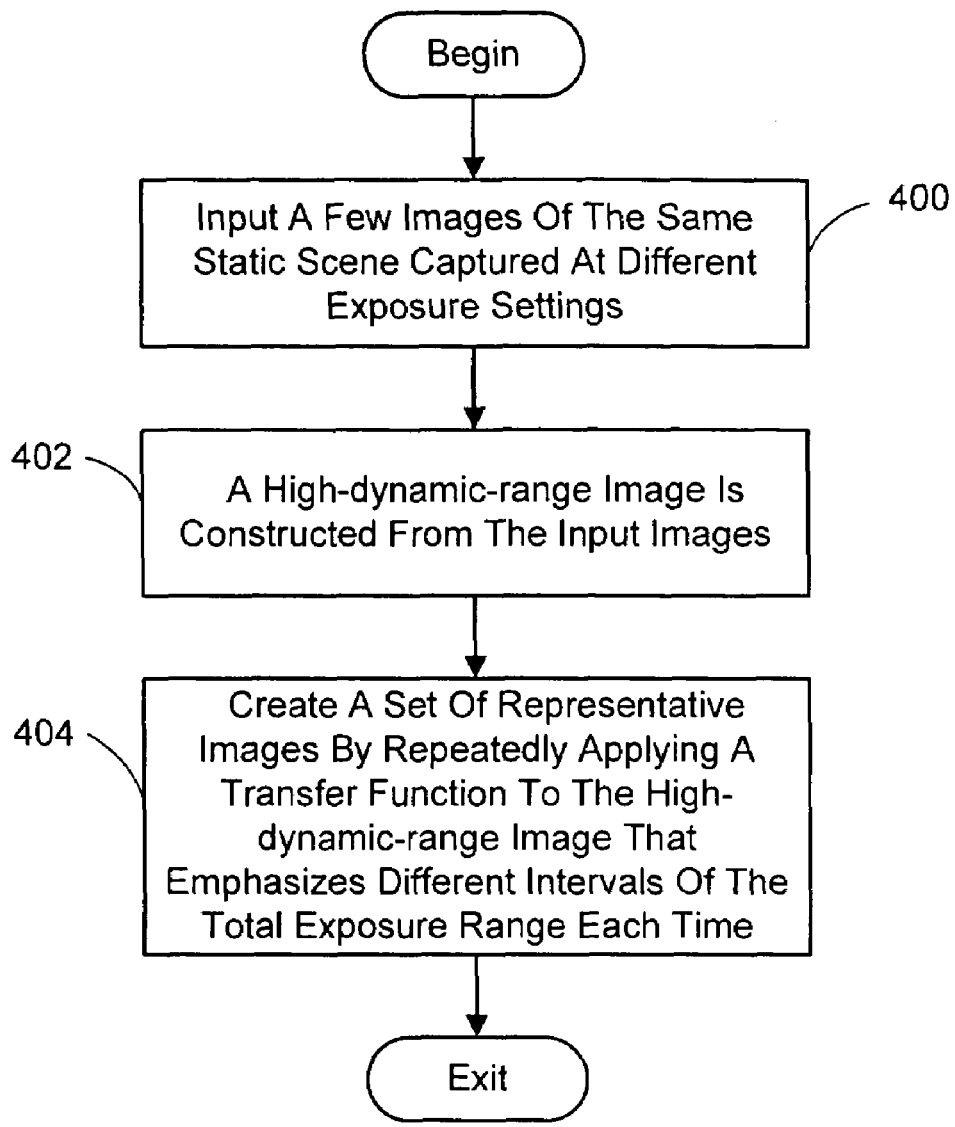
FIG. 4 is a flow chart diagramming a general process for creating a larger set of exposure-varying representative images from a few exposure-varied input images.

The first type of interactive image that will be described as an example involves the interactive effect of providing optimum exposure in selected areas (or all areas) of the displayed image. This type of interactive image has been dubbed a Decent Exposure interactive image. It is constructed, in the following example, from a few input images of the same static scene captured at different exposure settings, as indicated by process action 400 of the Decent Exposure interactive image construction process outlined in the flow chart of FIG. 4. The dimensionality of the interaction will be d=1 in that only the exposure setting is varied between input images. The small number of input images is used to construct an array of image representatives and a single index image. It is noted that a larger set of input images each varying in exposure could be used directly as the representative images. However, for this example a small set of input images employed in order to describe how a larger set of representative images are generated from the smaller set of input images.

Figures 5A, 5B, 5C:
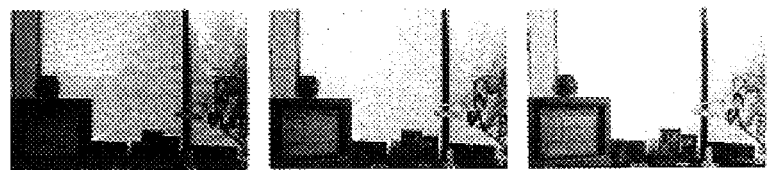
FIGS. 5(a)-(c) are images showing an office scene taken at three different exposure settings that can be used as input images.

FIGS. 5(a)-(c) show three images of an office scene taken at three different exposure settings. Note that outdoor objects seen through the window are best viewed in the image of FIG. 5(a), while indoor objects are best seen in FIG. 5(c). These images are the only input images and composing the sequence $\{I^*\}$.

The larger set of representative images is generated from the input images as follows. A high-dynamic-range image is constructed from the input images first (process action 402), and then repeatedly passed through a transfer function that emphasizes different intervals of the total range each time to create the desired set of representative images (process action 404). Construction of high-dynamic-range images is a well known procedure, and any of the conventional methods could be employed. However a novel process has been developed for application to interactive images. In particular, the aim is not to reconstruct accurate radiance maps, to specify a hardware rig to snap a high range image, or necessarily to construct a single perceptually high-range image, as is the case in most conventional procedures. Rather, the following approach can be taken in the context of interactive images.

Figure 6A:
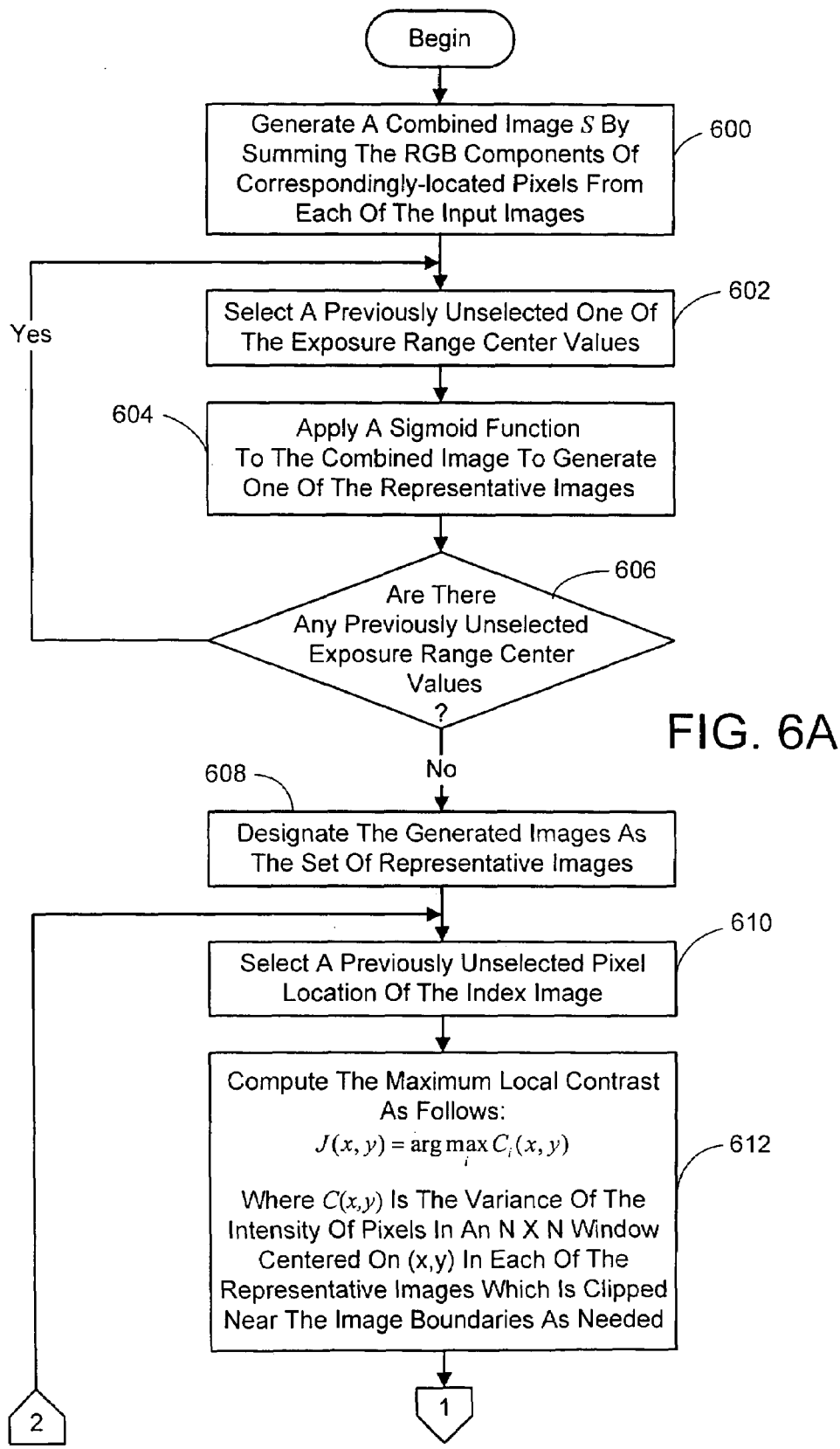
FIGS. 6A-B are a flow chart diagramming a process for constructing a version of the interactive image, referred to as a Decent Exposure interactive image, which allows the viewer to manipulate the exposure of a displayed image, and which incorporates the process of FIG. 4.
Figure 6B:
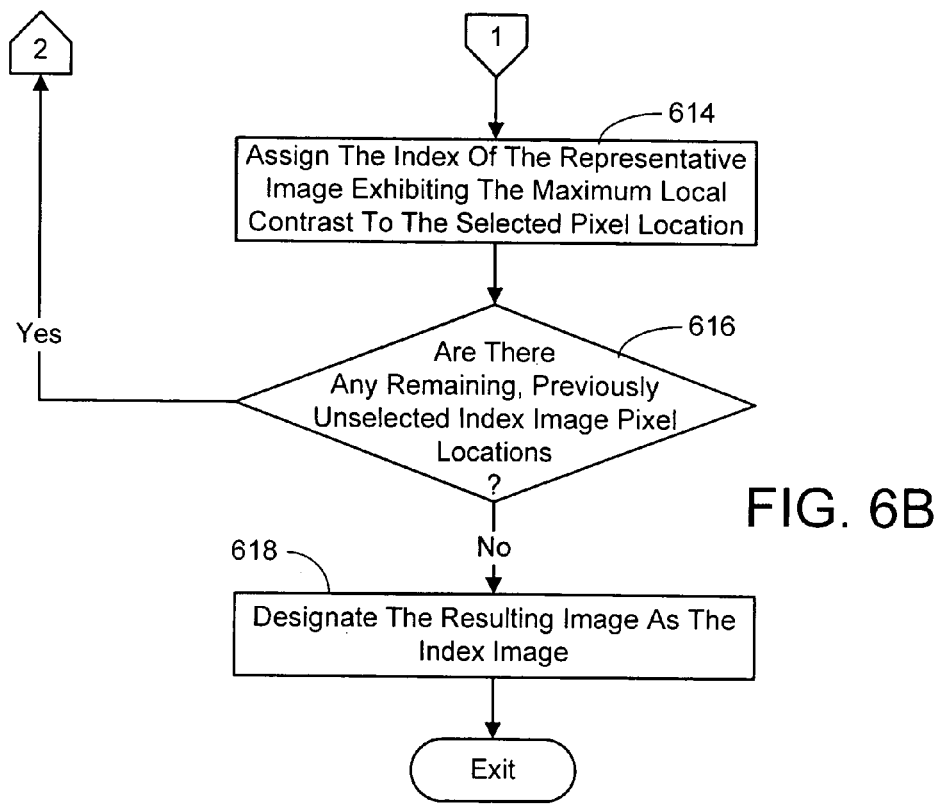

The process of creating a high-dynamic-range image begins by performing sums of the differently exposed originals—namely the three input images. Specifically, referring now to FIGS. 6A and 6B, the most straightforward sum possible is taken, where each pixel $S(x,y)$ is simply the channel-wise sum of the RGB components of correspondingly-located pixels ($I_i^*(x,y)$, $1 \leq i \leq n^*$) in the input image (process action 600). Representative images $I_i$ are constructed by passing S through a sigmoid transfer function with two parameters, $\mu$ and $\sigma$. The first parameter $\mu$ controls the center value of the exposure range to be emphasized and the second parameter $\sigma$ controls the extent of the expansion or contraction of values near the center value. Specifically, the following sigmoid function is employed:

$$T_{\mu,\sigma}(v) = \frac{1}{1 + \exp(-a_{\mu,\sigma}(v))}, \text{ where} \quad (1)$$

$$a_{\mu,\sigma}(v) = \frac{\sigma(v - \mu - k_{max})}{k_{max}}, \quad (2)$$

and where $k_{max}$ is the maximum value over all pixels/channels of S, and v is the input pixel value. T(.) is additionally scaled such that its minimum value corresponds to 0 and its maximum value is 255.

To generate the representative images, $\sigma$ is fixed at an appropriate number (e.g., $\sigma=4$ works well). In addition, equi-spaced values of $\mu_i$ are created such that $1 \leq i \leq n$, $\mu_1=0$, and $\mu_n=k_{max}$. To construct a representative image $I_i$, S is passed through the transfer function, with $T_{\mu_i,\sigma}(S(x,y))$ being computed for every pixel at a particular value of $\mu$. This process is repeated for each value of $\mu$ to compute the entire set of representative images. Accordingly, referring again to FIG. 6, a previously unselected value of $\mu$ is selected (process action 602). Then, S is passed through the sigmoid function defined in Eqs. 1 and 2 to compute the value of every pixel in the representative image being computed (process action 604). It is then determined if there are any previously unselected values of $\mu$ remaining (process action 606). If so, then process actions 602 through 606 are repeated for each remaining $\mu$ value. If no unselected values remain, the images generated are designated as the set of representative images (process action 608). The designated representative images are the only representative images employed in the example. The original input images I* are ignored, since they are likely to exhibit characteristics different from any of the constructed images (that is, they are unlikely to be generated from S and the aforementioned sigmoid function, no matter what values of $\mu$ and $\sigma$ are chosen).

Some representative images constructed in this way are shown in FIGS. 7(a)-(d). Note that the representative images span a perceptual range even greater than that of the original input images I*, though no new information is generated.

The index image is computed next with the intent of maximizing local contrast about each pixel location. To this end, a previously unselected pixel location of the index image is selected (process action 610). The maximum contrast associated with the selected pixel location is then computed as follows:

$$J(x, y) = \arg\max_i C_i(x, y), \quad (3)$$

with C(x,y) defined as the variance of the intensity of pixels in an N×N window centered on (x,y) in a representative image and clipped near the image boundaries as needed (process action 612). A value of N=15 pixels was used in tested embodiments, although generally other values can be successfully employed as well. The index of the representative image that exhibits the maximum local contrast as computed above is assigned to the selected index image pixel location (process action 614). It is then determined if there are any remaining, previously unselected index image pixel locations (process action 616). If so, process actions 610 and 616 are repeated until all the locations have been processed. Once all the pixel locations have been processed, the resulting image is designated as the index image (process action 618) and the process ends.

Figure 8:
FIG. 8 is an image representing the index image generated using the process of FIGS. 6A-B.

An example of the resulting index image is shown in FIG. 8. In this image, each of the indexed representative images is assigned a different pixel value, and that value is assigned to a pixel of the depicted image if the associated representative image is assigned to the correspondingly-located pixel of the index image.

In regard to the aforementioned modes of interaction, the Decent Exposure interactive image can operate in the ordinal, pixel-index, cumulative, and comprehensive modes. The ordinal mode of interaction is straightforward, and can be implemented as, for example, a GUI slider that allows a viewer to move back and forth through the representative images in assigned index order. In this way, any of the representative images can be viewed. The pixel-index mode of interaction was implemented in tested embodiments as a mouseover effect. Namely, when the screen cursor is placed at location (x,y) in a displayed image of the depicted scene, the representative image assigned to the corresponding pixel location in the index image is displayed to the viewer. The cumulative mode of interaction was implemented in the tested embodiments by a viewer selecting a sequence of locations in the displayed cumulative image via a mouse click. On the first click, the cumulative image H displayed is whatever representative image $I_{i_1}$ corresponds to the correspondingly-located pixel location of the index image. On each subsequent mouse click m, which selects a pixel of the displayed image corresponding to a pixel of the index image that is associated with a representative image that has not been added previously to the cumulative image, a pixel/channel-wise weighted sum is performed to generate the current cumulative image for display to the user. Namely, $$H \leftarrow \frac{1}{m} I_{i_m} + \frac{m-1}{m} H. \quad (4)$$

Figures 7A, 7B, 7C, 7D:
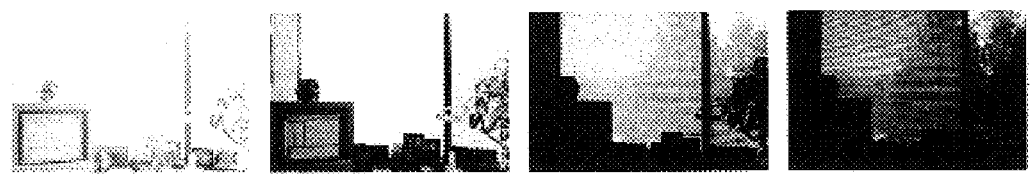
FIGS. 7(a)-(d) are images showing four different representative images generated using the process of FIGS. 6A-B.
Figure 9:
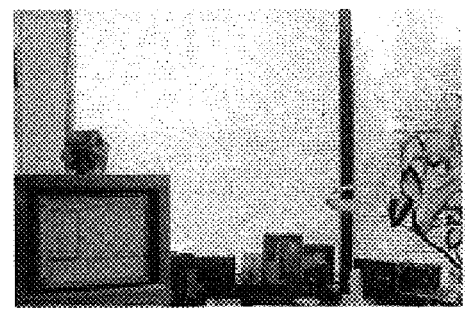
FIG. 9 is an image showing an example of a cumulative image that can be generated using the Decent Exposure interactive image created in accordance with the process of FIGS. 6A-B.

One possible cumulative image is shown in FIG. 9, and represents the combination of the representative images depicted in FIGS. 7(b) and (c). As for the comprehensive mode of interaction, when a viewer chooses this mode one possibility is to compress the aforementioned summed image S into a displayable range by scaling the RGB values to between 0 and 255. Alternately, a more sophisticated option is to maximize contrast in each sub-region and smoothly blending the results via a conventional blending technique.

3.2 Hocus Focus Interactive Images

The next exemplary type of interactive image that will be described involves the interactive effect of showing a selected area (or all areas) in a displayed image "in focus". This type of interactive image has been dubbed a Hocus Focus interactive image. Hocus Focus interactive images are interactive images in which the dimensionality of interaction is again d=1 and that single parameter is the camera focus setting.

Figure 10A:
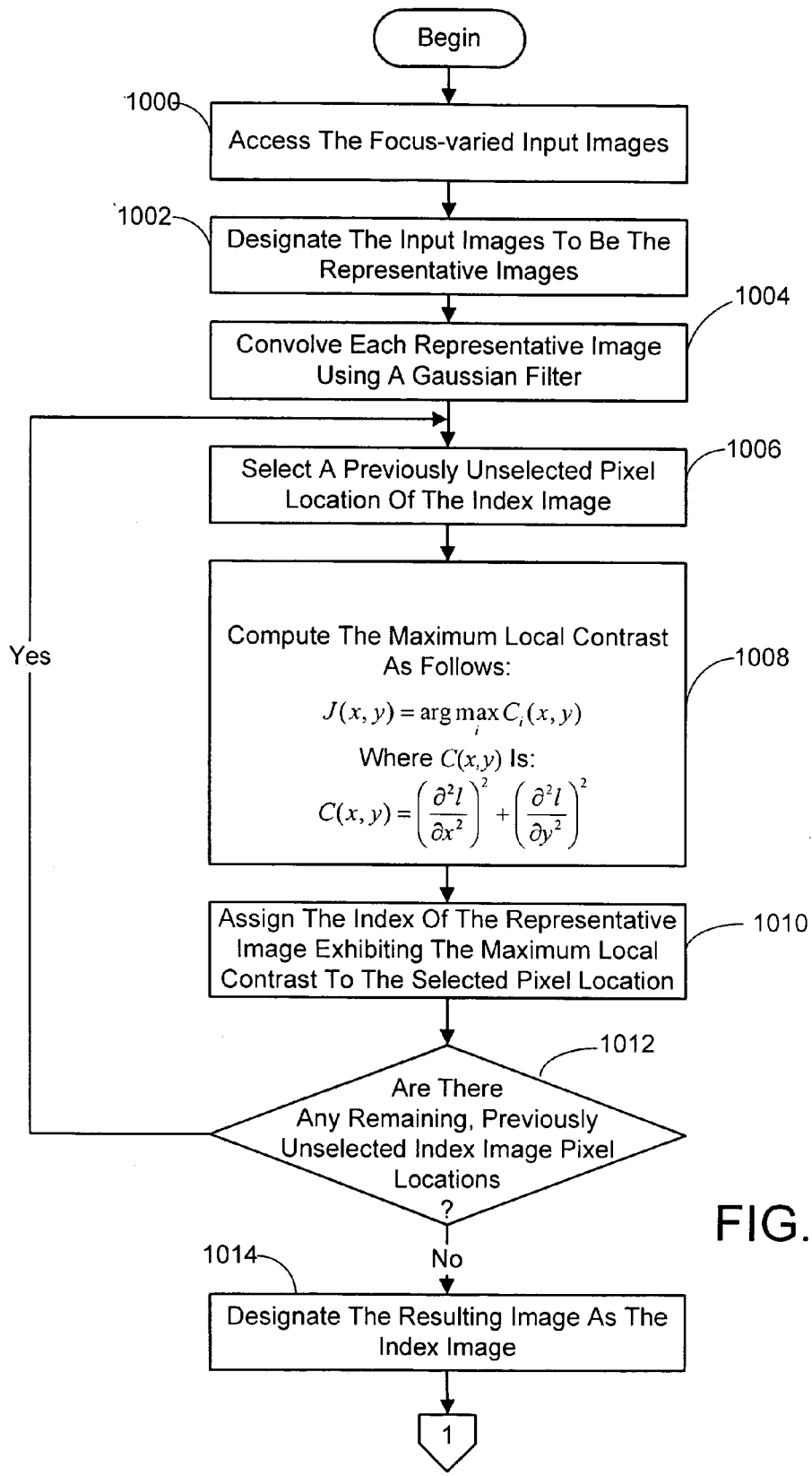
FIGS. 10A-B are a flow chart diagramming a process for constructing a version of the interactive image, referred to as a Hocus Focus interactive image, which allows the viewer to manipulate the depth of focus.

In the example that will be described, 27 input images I*(i.e., n*=27) were captured of a particular static scene as the camera focus was varied from near to far. Thus, the process of creating a Hocus Focus interactive image begins with inputting the focus-varied input images, as indicated in process 1000 of FIG. 10A. FIGS. 11(a)-(d) show a sample of four of these input images. Note that due to differential blurring based on the depth of an object, different objects come into focus in different images. In this example, the 27 input images were deemed to be a sufficient number of images to produce the desired interactive effect. Accordingly, the input images themselves were designated to be the representative images (process action 1002). However, the task of computing the index image still remains.

The index image will map each pixel to an index, which identifies the representative image that exhibits the sharpest focus for that pixel location. Computation of the index image can be viewed as a variation of the conventional "depth-from-focus" techniques in computer vision. In particular, where depth-from-focus techniques concentrate on actually determining the relative distance of image objects from the camera, the present procedure is only concerned with identifying the index of the corresponding image at that depth. To this end, the following novel process has been developed to accomplish the task.

The standard model of blurring supposes that pixels have been convolved with a pillbox function—i.e., a constant-valued disc centered at the origin and zero elsewhere. Effectively, what this means is that blurred pixels are generated by a weighted average of the nearby pixels that might be collected by an ideal pinhole. In such a case, the more the blurring, the more pixels that have been averaged. Averaging decreases the local contrast in an image, and so it follows that J(x,y) should be computed to maximize contrast as in Eq. 3, but where $C_i(x,y)$ is specified for an even smaller neighborhood. Specifically, the index image is generated by first computing the contrast as the sum of the squares of the second spatial derivative:

$$C(x, y) = \left(\frac{\partial^2 l}{\partial x^2}\right)^2 + \left(\frac{\partial^2 l}{\partial y^2}\right)^2, \quad (5)$$

where l(x,y) is the (1-dimensional) luminance of pixel I(x,y), and the partial derivatives are computed by repeated application of finite differences.

Accordingly, referring to FIG. 10A once again, a previously unselected pixel location of the index image is selected (process action 1006). The maximum local contrast associated with the selected pixel location is then computed as follows J(x,y)=arg max$C_i$(x,y), with C(x,y) defined as $$C(x, y) = \left(\frac{\partial^2 l}{\partial x^2}\right)^2 + \left(\frac{\partial^2 l}{\partial y^2}\right)^2,$$

as indicated in process action 1008. The index of the representative image that exhibits the maximum local contrast as computed above is assigned to the selected index image pixel location (process action 1010). It is then determined if there are any remaining, previously unselected index image pixel locations (process action 1012). If so, process actions 1006 through 1012 are repeated until all the locations have been processed. Once all the pixel locations have been processed, the resulting image is designated as the index image (process action 1014).

Figure 10B:
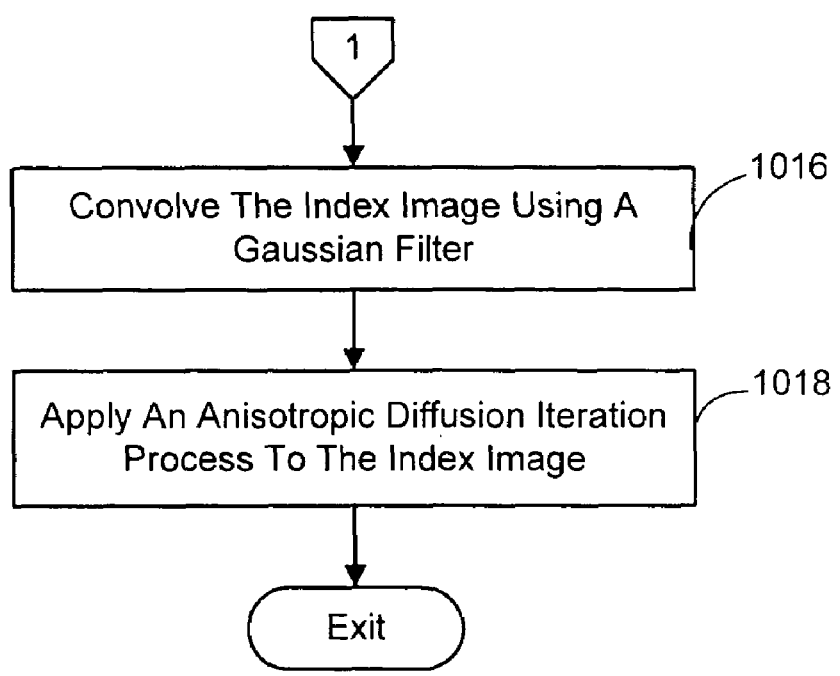

FIG. 12(a) represents the index image computed as described above where darker pixel values correspond to objects being in focus far from the camera. Empirically, two problems can be observed that make the foregoing naïve computation less than ideal. First, camera noise turns out to be a strong source of apparent contrast by this metric. And second, regions that lack texture do not exhibit strong contrast at any focus setting. The first problem is overcome by pre-processing the representative images prior to using them to produce the index image, and then post-processing the index image. In both cases this processing involves convolving the respective images using a Gaussian filter with σ=2 pixels. Thus, referring to FIG. 10A, process action 1004 of convolving each representative image using a Gaussian filter is performed prior to computing the index image. In addition, referring now to FIG. 10B, once the index image has been computed, process action 1016 of convolving the index image using a Gaussian filter is performed. Since the contrast function of Eq. 5 is not linear, pre-processing and post-processing have different effects. Namely, pre-processing smoothes the original images and post-processing smoothes the resulting index image.

To mitigate the second problem, in process action 1018, an anisotropic diffusion process is applied to the index image, where iterations are performed to satisfy the following:

$$\frac{\partial J}{\partial t} = k_d \nabla^2 J. \quad (6)$$

To work toward the steady state, the iteration is conducted as follows:

$$J_t = J_{t-1} - \alpha \text{div} \left[\rho'(\nabla\|J\|)\nabla J\right], \quad (7)$$

where ρ is a monotonic function such as 1−exp(−kx²).

FIG. 13 is an image of the relative maximum contrast values over all the representative images I. The lighter pixels in this image have high maximum contrast and are likely to be reliable indicators of the actual depth. FIG. 13 indicates that the initially computed index values are reasonable estimates. As such, it is possible to run the aforementioned iterations with a clamp on pixels J(x,y). Thus:

$$J_t = J_{t-1} \quad \text{if } \max_i C_i(x, y) > k_{mc}, \quad (8)$$

where $k_{mc}$ is set to some fraction of the maximum contrast over all the representative images. The value of $k_{mc}$ is dependent on camera shot noise and should be selected accordingly. In tested embodiments, it was found that $k_{mc}$=0.06 times the maximum contrast was appropriate. Intuitively, the diffusion allows good index values to flow into untextured regions, whose index values are assumed to be near those of their bounding edges (which necessarily provide good measures of contrast).

FIG. 12(b) is an image representing how the final index image appears after 100 iterations of diffusion have been performed on the initial index image shown in FIG. 12(a). As can be seen camera noise and errors caused by untextured regions has been reduce significantly.

The Hocus Focus interactive image can operate in the ordinal, pixel-index, cumulative, and comprehensive modes of interaction. The ordinal mode of interaction is again straightforward and can also be implemented as a graphic user interface slider that allows the viewer to move back and forth through the representative images in assigned index order. The pixel-index mode of interaction was implemented in tested embodiments as a mouseover effect, just as it was in the case of the Decent Exposure interactive image. Accordingly, when the screen cursor is placed at location (x,y) in a displayed image of the depicted scene, the representative image $I_{J_{final}(\hat{x},\hat{y})}$ associated with the corresponding pixel location in the index image is displayed to the viewer. This image will depict the object or area under the cursor in sharp focus. The cumulative mode of interaction was implemented in the tested embodiments by a viewer selecting a sequence a locations in the displayed cumulative image via a mouse click. With each click of the mouse on an image coordinate $(\hat{x},\hat{y})$, the pixels given by, $$\{(x,y):J_{final}(x,y)=J_{final}(\hat{x},\hat{y})\}, \quad (9)$$

are set to their values from image $I_{J_{final}(\hat{x},\hat{y})}$, ideally bringing all objects in that depth plane into sharp focus. FIG. 14 is an example cumulative image that brings near and far elements into sharp focus, while keeping middle-range objects out of focus. This interesting effect is impossible with analog photographs. In the case of a Hocus Focus interactive image, a comprehensive image K is constructed upon a request by the viewer as follows:

$$K(x,y)=I_{J_{final}(x,y)}(x,y), \text{ for all } (x,y). \quad (10)$$

The resulting globally in-focus image is then displayed to the viewer. An example of such a comprehensive image is shown in FIG. 15.

3.3 Color Satura Interactive Images

A somewhat different class of interactive images will now be described. What makes this class different is that, unlike Decent Exposure and Hocus Focus interactive images, the representative images can be generated using just a single input image. Interactive images involving effects such as color saturation and resolution fall into this alternate class. An interactive image dubbed Color Satura will be described as an example of the alternate class.

Figure 16:
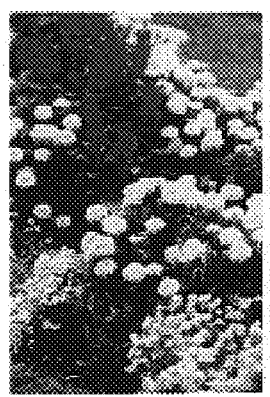
FIG. 16 is a full color image showing a garden scene that can be used as an input image for an interactive image that allows a viewer to manipulate the color of a displayed image.

Color Satura interactive images are interactive images that are created from a single full color image (such as the one shown in FIG. 16), and which provide an interaction that allows a viewer to explore the three-dimensional RGB color space. The representative images produced from the full color input image look like a largely de-saturated version of the input image, but with certain pixels colored in. Depending of the mode of interaction, the viewer can browse through the RGB space and see different parts of the displayed image "light up" with color, while other parts fade back into gray. The dimensionality of interaction in this case is d*=1 (i.e., color), but the representative images live in a space of dimensionality d=3.

Figure 17A:
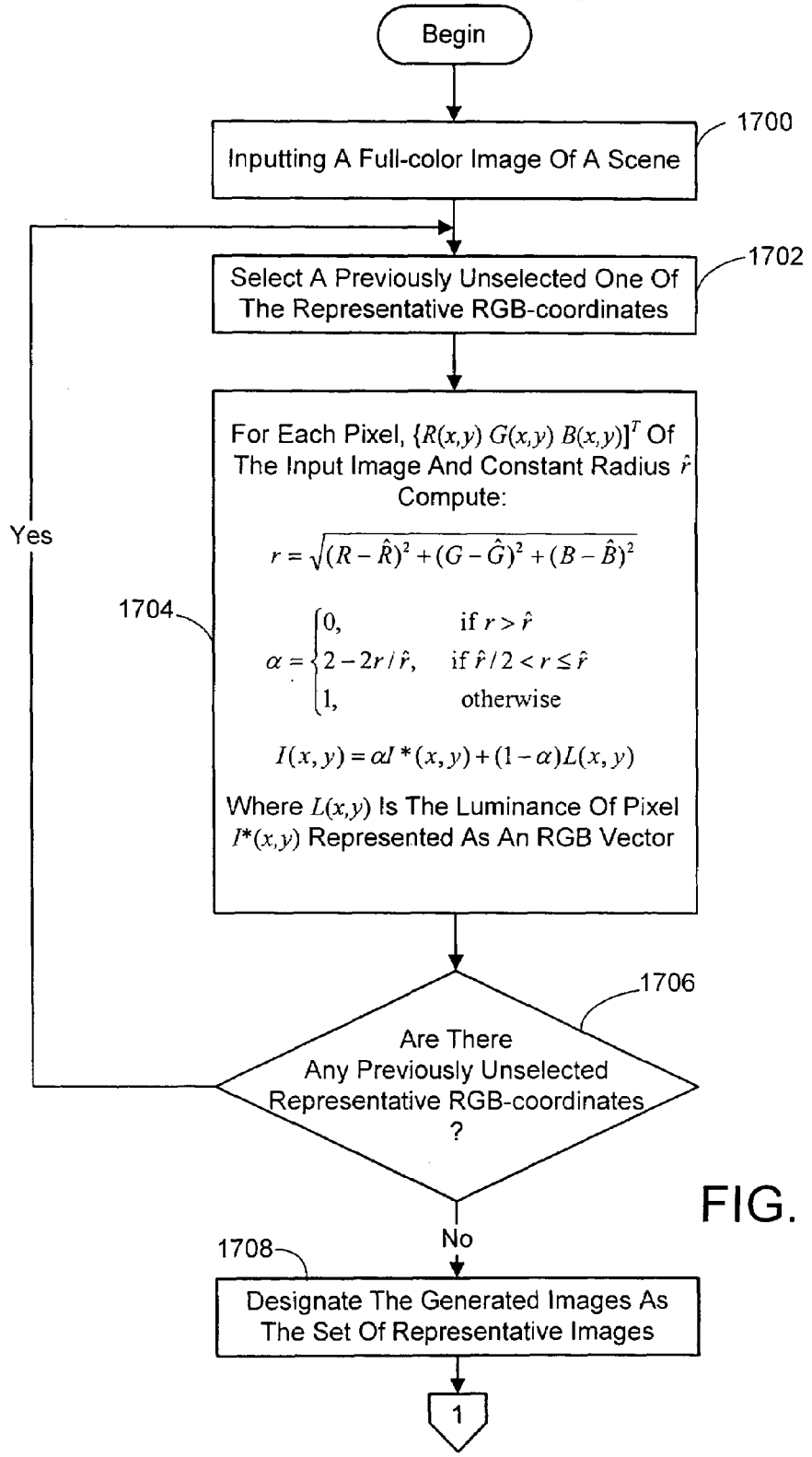
FIGS. 17A-B are a flow chart diagramming a process for constructing a version of the interactive image, referred to as a Color Satura interactive image, which allows the viewer to manipulate the color of a displayed image.

The process of creating a Color Satura interactive image begins with inputting a full-color image of a scene, as indicated in process 1700 of FIG. 17A. To produce the representative images, the following operation is performed for each pixel, $\{R(x,y)\ G(x,y)\ B(x,y)]^T\}$ of the input image, for each representative RGB-coordinate, $[\hat{R}\ \hat{G}\ \hat{B}]^T$, and a constant radius, $\hat{r}$, where:

$$r = \sqrt{(R-\hat{R})^2 + (G-\hat{G})^2 + (B-\hat{B})^2}, \quad (11)$$

$$\alpha = \begin{cases} 0, & \text{if } r > \hat{r} \\ 2-2r/\hat{r}, & \text{if } \hat{r}/2 < r \le \hat{r} \\ 1, & \text{otherwise} \end{cases} \quad (12)$$

$$I(x,y) = \alpha I*(x,y) + (1-\alpha)L(x,y), \quad (13)$$

and where L(x,y) is the luminance of pixel I*(x,y) represented as an RGB vector (i.e., R=G=B).

Accordingly, referring again to FIG. 17A, a previously unselected representative RGB-coordinate, $[\hat{R}\ \hat{G}\ \hat{B}]^T$ is selected (process action 1702). Eqs. 11 through 13 are then used to compute a value for each pixel in the representative image being computed (process action 1704). It is then determined if there are any previously unselected representative RGB-coordinates remaining (process action 1706). If so, then process actions 1702 through 1706 are repeated for each remaining representative RGB-coordinate. If no unselected values remain, the images generated are designated as the set of representative images (process action 1708).

The representative RGB coordinates, $[\hat{R}\ \hat{G}\ \hat{B}]^T$, can be chosen in a variety of ways. For example, choose N×N×N values of $[\hat{R}\ \hat{G}\ \hat{B}]^T$, to be equally spaced between 0 and 255 (assuming 8-bit color channels). Thus, each representative RGB coordinate corresponds to the center RGB value of one of a series of equal-size color space ranges. In tested embodiments it was found that N=4 and $\hat{r}$=170 creates pleasing representative images on a variety of images. Another way to choose the representative RGB coordinates, $[\hat{R}\ \hat{G}\ \hat{B}]^T$, is to take a subset of the previous set in which exactly one or two of the $\hat{R}$, $\hat{G}$, and $\hat{B}$ values are equal to 255. These are the 6(N−1) most color-saturated coordinates and reduces the effective dimensionality of the interactive image to d=2.

Figure 18:
FIG. 18 is an image representing the index image generated using the process of FIGS. 17A-B.
Figure 17B:
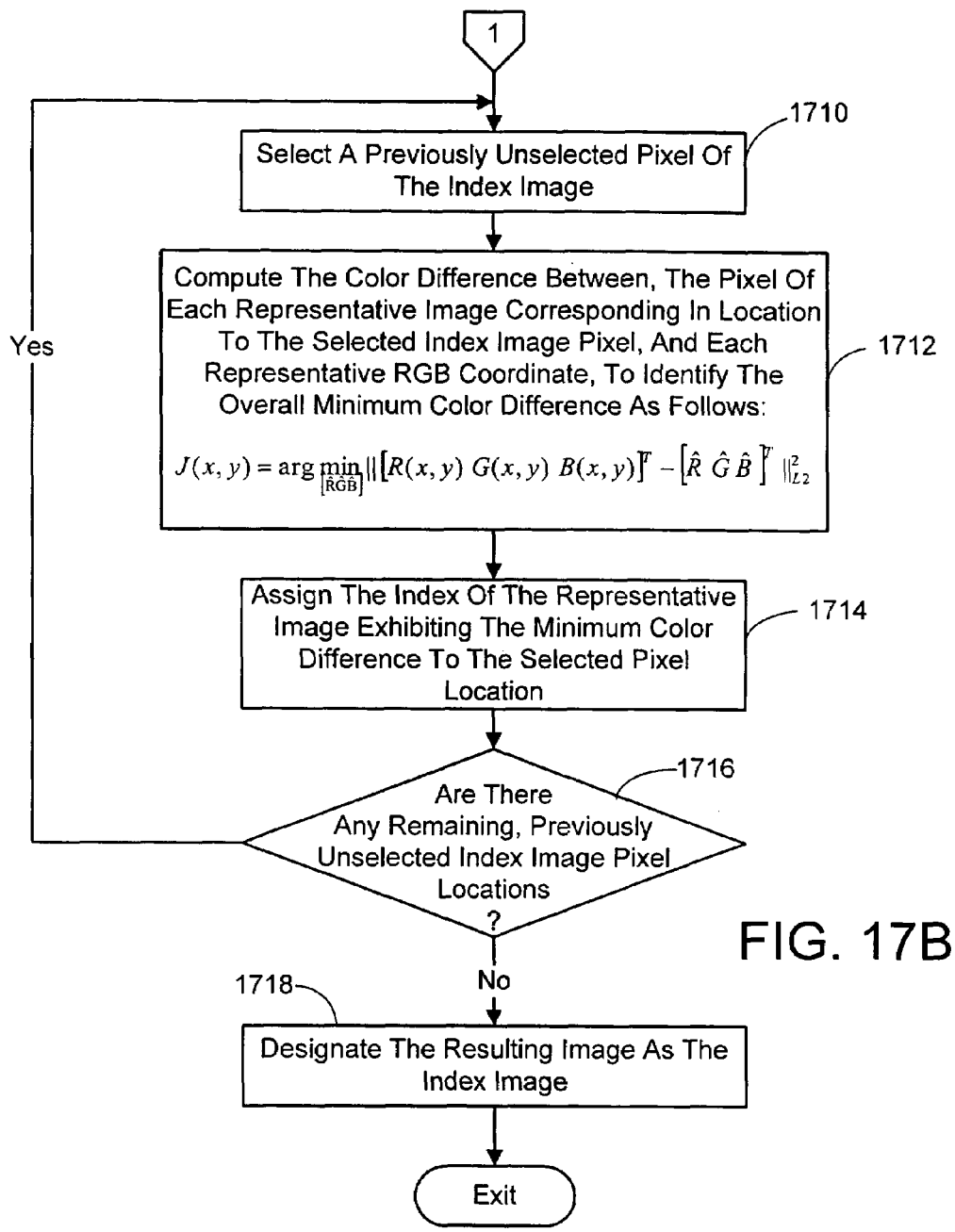

The index image is computed next. First, referring now to FIG. 17B, a previously unselected pixel of the index image is selected (process action 1710). The color difference between, the pixel of each representative image corresponding in location to the selected index image pixel, and each representative RGB coordinate, is computed to identify the overall minimum color difference (process action 1712). Specifically, $$J(x,y) = \arg\min_{[\hat{R}\hat{G}\hat{B}]} \left\| [R(x,y)\ G(x,y)\ B(x,y)]^T - [\hat{R}\hat{G}\hat{B}]^T \right\|_{L2}^2, \quad (14)$$

where the J values are RGB vector values (process action 1714). Next, the index of the representative image exhibiting the minimum color difference is assigned to the selected pixel location (process action 1714). It is then determined if there are any remaining, previously unselected index image pixel locations (process action 1716). If so, process actions 1710 through 1716 are repeated until all the locations have been processed. Once all the pixel locations have been processed, the resulting image is designated as the index image (process action 1718). FIG. 18 shows an example of an index image color-coded to show the different indices.

Figure 19A:
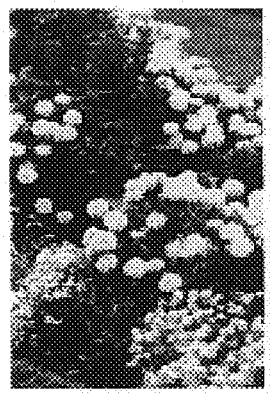
FIGS. 19(a)-(b) are two different example images showing the garden scene as it would be displayed as a result of a viewer manipulation of a Color Satura interactive image of the garden scene created in accordance with the process of 17A-B.
Figure 19B:
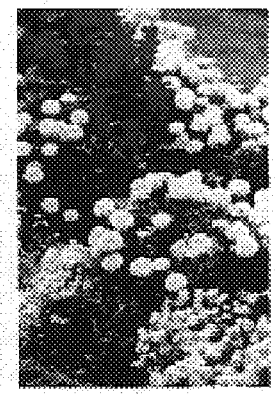
Figure 20:
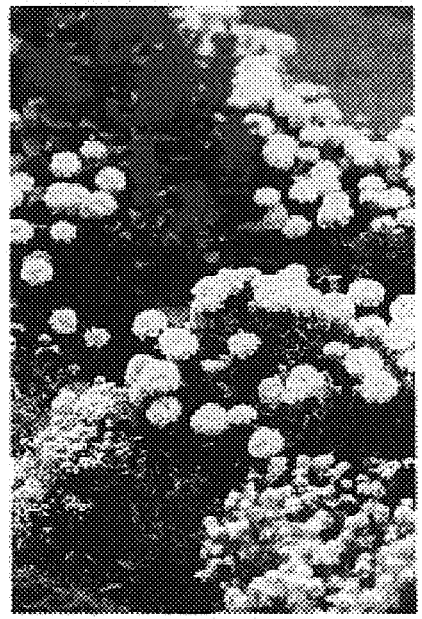
FIG. 20 is an image showing an example of a cumulative image that can be generated using the Color Satura interactive image created in accordance with the process of FIGS. 17A-B, where the viewer has chosen to see pixels having both the red color associated with some of the flowers, and the yellow color associated with other flowers, in color.

Given the set of representative images and the index image, the Color Satura interactive image can operate in the ordinal, pixel-index, or cumulative modes of interaction. As for the comprehensive mode, the full color input image, which displays all the colors simultaneously, is the comprehensive image in this case. Accordingly, if the viewer selects the comprehensive mode of interaction, the input image is displayed. The ordinal mode of interaction can be accomplished as described in connection with the Decent Exposure or Hocus Focus interactive images by using a single slider tool to browse through the representative images. However, an alternate method can be employed, which gives the viewer more control over what color is displayed. Namely, the ordinal mode can be implemented using keyboard keys. Three separate pairs of keyboard keys are used move up or down in the R, G and B levels, respectively, with the corresponding representative image being displayed. In the case of the pixel-index mode of interaction, it was implemented in tested embodiments as before using a mouseover effect. When the cursor is placed at a location (x,y) on the displayed image, the representative image assigned to the corresponding pixel location of the index image is displayed instead. For example, when the cursor is placed on a pixel location corresponding to a red flower, the representative image assigned to the corresponding pixel location in the index image is displayed, and will show only those pixels having the selected pixel's color "in color". All the remaining pixels will appear in shades of gray. FIG. 19(a) is an example of this scenario. FIG. 19(b) shows the results of placing the cursor on a yellow flower instead. It is noted that the reduced RGB set described previously tends to create a more interesting interaction by ensuring that some pixels necessarily saturate with color no matter where the cursor is placed. As for the cumulative mode, this was implemented in tested embodiments using mouse clicks. Essentially, with each mouse click after the first, the representative image associated with the selected location in the index image is combined with the displayed image to create a cumulative image. In other words, with each click, all the pixels having the color associated with the selected pixel location become saturated with color without disturbing any of the previously saturated colors of the displayed image. FIG. 20 is an example of a cumulative image where the viewer made two selections—one on a red flower and one on a yellow flower.

4. Digital Video and Virtual Reality Using Interactive Images

The interactive image concept can also be extended into digital video and virtual reality applications. In essence each of these applications merely displays a sequence of images to a viewer. In the case of a digital video, the sequence is a temporal sequence with each image showing the scene at a different point in time. In the case of a virtual reality application, the image displayed is either a rendered image created by a conventional Image Based Rendering technique such as panoramic videos or concentric mosaics, or a synthetic image generated using conventional techniques. In either case, the displayed image shows the virtual scene from a viewer selected viewpoint and direction. Since digital video and virtual reality applications involve the display of a sequence of images, these images can be made interactive, thereby creating an interactive digital video or a more fully interactive virtual reality experience.

To create an interactive video, the video would be processed in one of the ways described previously to produce an interactive image for some or all of the video frames. The viewer can then interact with the video in a variety of ways. For example, the viewer could request the video to be paused so that a single frame is displayed indefinitely. The viewer can then interact with that displayed frame just as with any interactive image. Once the viewer is through interacting with the interactive image associated with the paused frame of the video, the viewer requests that playing of video be resumed. Another form of interaction, akin to the pixel-index mode of interaction described previously, involves the viewer selecting a pixel location in the scene being depicted while the video is running. The particular interactive effect embodied in the video that is associated with the selected location is then created in each subsequently scheduled frame associated with an interactive image, prior to it being displayed to the viewer, until the viewer selects a different location. For example, suppose each frame of a video is an interactive image having the interactive effect of showing the region associated with the selected pixel location at the sharpest focus possible. When a viewer selects a location, the representative image showing the selected location at the sharpest focus is displayed as the next frame of the video played, and so on for each subsequent frame; until the video ends or a new location is selected. The previously-described cumulative and comprehensive modes of interaction can also be extended to an interactive video. In the cumulative mode, as the viewer selects new location, the interactive effect associated with the video is realized not just for the selected location as described above, but for all the previously selected locations as well. Thus, each frame of the video displayed is a combination of representative images associated with the frame. This is also the case when the comprehensive mode of interaction is requested, with the exception that the viewer need not select a location in the video display. Rather, the representative images associated with each frame of the interactive video are automatically combined to produce a comprehensive frame prior to it being display.

As for combining interactive images with virtual reality applications, the virtual reality system would operate normally allowing a viewer to navigate through a virtual scene by changing their viewing position and orientation. However, the fact that each displayed image is expanded to become an interactive image enables viewers many more degrees of freedom when exploring virtual environments. An example scenario is an Internet home tour. As the viewer pans around a room the imagery is usually correctly exposed to either see the room contents or to see the view outside the windows. It is impossible to choose an appropriate exposure to see both details. However, by using interactive images as the viewer pans around the home, a correctly exposed image would be displayed depending on the current viewer focus. This could be done automatically, or via user interaction by selecting an area he or she wishes to exhibit the optimum exposure level. In the case of a panoramic video based virtual reality system, the interactive images would take the form of a series of representative panoramic images associated with each frame of the video. In the case of a concentric mosaic based virtual reality system, each slot image that is used to construct the rendered image of the scene presented to the viewer would actually be a series of representative slot images. Just as with the representative images described previously, the representative panoramic images and slot images would vary in some predetermined parameter (e.g., focus, exposure, color saturation, among others). Thus, for example if the interactive effect embodied in the representative images involved exposure levels, the particular representative panoramic image, or the set of representative slot images, which produce a rendered image showing a selected region at an optimum exposure level, would be employed in the rendering process. As indicated previously, this selection could be automatic based on the viewer's current viewpoint and viewing direction, or based on the viewer manually selecting a pixel location in the displayed image.

5. Additional Features 5.1 Initially Displayed Images

In the foregoing description of the interactive image system, no mention was made of what image is initially displayed to the viewer. This can be handled in a variety of ways depending of the desired interactive effect and the requested mode of interaction. One option is to simply display one of the representative images randomly. Alternately, a prescribed one of the representative images could be displayed, for example, the first, middle or last image in the indexed set. Still another option would be to allow the viewer to choose the initial image from among the representative images associated with the interactive image. Further, in some applications, it can be desirable to initially display a modified image of some sort. For example, consider the case where the desired interactive effect and interaction mode is such that when a viewer selects a pixel location of the displayed image, the representative image (or a cumulative image including the representative image) highlighting the regions of the scene having a color matching that of the selected location, is displayed to the viewer (i.e., the above-described Color Satura interactive image). In such a case, the initial image could be a gray scale or color unsaturated image of the scene so as to sharply contrast with the next image displayed that includes some color. The gray scale image could be generated by simply converting the pixels of a full color image of the scene to gray scale levels. This is just one example of an image that could be generated as an initial image for display to the viewer. Essentially, the initial image could be any image that enhances or facilitates the interactive effect for the requested mode of interaction.

5.2 Index Image Smoothing

The index image can optionally be smoothed to prevent abrupt changes in the displayed scene when a pixel near the last-selected pixel location is selected In order to perform this smoothing operation, it is first necessary to index the representative images in a sequential order appropriate for the interaction effect the images embody. In regards to parameters such as focus, exposure, and the other camera related effects, the representative images are simply indexed in the order of the lowest setting to the greatest setting for the particular parameter or parameters varied among the images. In cases where two or more parameters are varied in opposition to each other (e.g., one is increased with each input image captured and another is decreased), one of the varied parameters is chosen and the representative images ordered in accordance with it. Once the representative images have been indexed in an appropriate order, the index image is smoothed using any conventional smoothing technique, such as for example, Gaussian blurring, medial filtering, or anisotropic smoothing. It is noted that the representative images can be indexed in any order if smoothing is not to be performed on the index image.

5.3 On-Demand Generation of Representative and Index Images

The representative images and index image can be generated before viewer interaction begins and stored. However, if sufficient processing power is available, it is also possible to save storage space by constructing the representative and index images from input images at the time a viewer request is made. This latter scenario is particularly beneficial in interactive image systems that offer a viewer multiple interactive effects. For example, the viewer might be able to elect whether the displayed image will change in focus or exposure, or color saturation. Storing separate representative images and index images for each of these can be very memory intensive. Thus, the memory space saved by generating the representative images and index image on demand would be considerable. In addition, if the viewer requests the aforementioned ordinal mode of interaction, no index image is needed as the viewer simply browses through the representative images. Thus, the on-demand version of the interactive image system would have the further benefit of not having to generate an index image when the ordinal interaction mode is initiated.

5.4 Data Compression

Data compression is also a consideration in reducing the storage requirements for the interactive image system. The use of conventional image compression techniques to reduce the amount of data that must be stored is one possibility. In addition, the fact that the representative images correspond to a set of images in which some parameter has been varied can in some case allow a form of compression that reduces these images to a single comprehensive image. For example, a set of representative images depicting a scene at different focus settings can be used to generate a single globally focused image. This globally focus image can be derived from the index image associated with the representative images. Essentially, the value of each pixel of the globally focused image would be derived from the representative image exhibiting the best focus for the location of that pixel. The index image is used to identify the "best focus" representative image for each pixel location. An auxiliary image is also created that identifies a pixel wise depth of the scene depicted in the global focus image. Given these two images the interactive image system can generate the representative images and index image when needed to respond to a viewer request. The globally focused and auxiliary images will require much less storage space than the complete set of representative images. Another example is a set of representative images that vary in exposure level. In this case the representative images can be used to generate a high dynamic image via conventional methods and an auxiliary image identifying the subbands needed to recreate the representative images from the high dynamic image. Here again much less storage space is required for the high dynamic and auxiliary images than is needed to store the entire set of representative images. A similar compression approach can be employed with a full color image of a scene from which representative images at various specific color levels can be derived, or from a high resolution image from which lower resolution representative images can be generated.

It is also noted that the advantages of compression also apply to the situation where the representative and index images are generated remotely, and transferred via a network, such as the Internet, to a viewer's computer.

5.5 Interactive Regions

The interactive image system need not be tied to the entirety of a displayed scene. For example, the displayed image could be an image having regions that do not change, while other areas are associated with an interactive image corresponding to that region. In this version of the interactive image system, only those "interactive" regions of the displayed image would change in response to a viewer's requests and pixel selections.

5.6 Moving Object Effect

It was previously stated that the scene captured in the input images and embodied in the representative images was typically static, with an exception. The exception involves taking a series of input images of an active scene over time such that the motion of objects in the scene is captured. These input images are then used in the same ways described previously. This results in an interesting effect where the displayed image, which can be one of the representative images or some combination of these images, will show the moving object frozen at some location in the scene. When a viewer interacts with the image, other representative images or combinations thereof will be displayed showing the moving object in another location. Thus, the object will appear to the viewer as if it has been transported to a new location in the scene.

5.7 Generalized Index Images

Index images are simply mappings that link a 2-dimensional xy coordinate to a representative image. But, there are cases when two dimensions are not enough. In this case, the index image is generalized to an n-dimensional index hypervolume that maps an n-dimensional coordinate to a representative image. For example, in the case of an interactive panorama, there are three parameters: pan, tilt, and zoom. Thus, an interactive panorama requires a mapping from 3D coordinates to representative image indices.

Again, both index hypervolumes and representative images can be computed on demand. As the number of dimensions grows, it becomes more likely that the on-demand mode will be used as there is an exponential increase in the number of representative images that will need to be generated.

6. Creating Image Art and Photographs Using Interactive Images

The foregoing description of interactive images (and their extension into digital video and virtual reality applications) has involved a viewer directly interfacing with the interactive image system to produce a desired effect for that user. However, it is pointed out that the images displayed as a result of this interaction could be saved, such that they can be presented later without interactive capability to a final viewer. In other words, the initial viewer plays the role of an image artist who uses the interactive image system as a production tool to create images for others to see—just like painting a picture. Thus, the artist can use the interactive image system to produce images of a scene exhibiting the one of more of the effect described previously (e.g., focus, exposure, color, and so on) for artistic impact. For example, these effects can be used to draw a viewer's attention to a particular portion of the depicted scene that might normally be overlooked. Psychophysical research has shown that the human visual system is naturally and immediately attracted to regions of an image which exhibit high frequency (i.e., locally high contrast) or saturated color. This research shows these regions "pop out" immediately for observers without requiring a serial search over the entire image. By giving an artist control to determine what elements of an image are in focus, an interactive image system allows the viewer's attention to be directed to a particular object or region depicted in the resulting displayed image. This has particular application to images created for advertising and the like.

Similar advantages are afforded photographers as well. For example, consider the situation where a photographer must capture several images at different camera settings in hopes of obtaining a shot having the right effect, whether it be focus, exposure, or another camera parameter. If the photographer is using film, he or she would not even know if the desired shot had been captured until after the film has been developed. Compare this to the flexibility provided by an interactive image. Suppose the parameter the photographer wants to get just right is focus. Rather than randomly varying the focus and hoping one of the images has the desired focus characteristics, the photographer need only capture a series of digital images at varying focus settings. These images are then input into an interactive image system and the photographer can manipulate the depths of field post hoc to produce an image with the desired focus characteristics. Thus, success is assured, rather than left to chance.

What is claimed is:

1. A computer-implemented process for creating an interactive image, comprising using a computer to perform the following process actions:
   inputting at least one digital image of a scene;
   deriving from the at least one inputted image a set of separate and distinct representative images which depict the scene with one or more image parameters varying between images;
   computing a n-dimensional index hypervolume that maps n-dimensional coordinates to the representative image that exhibits a desired effect related to the varied parameter at a pixel location corresponding to the n-dimensional coordinates.

2. A computer-readable medium having computer-executable instructions for performing the process actions recited in claim 1.

3. A system for creating an interactive image, comprising:
   a general purpose computing device;
   a computer program comprising program modules executable by the computing device, wherein the computing device is directed by the program modules of the computer program to,
   input at least one digital image of a scene;
   derive from the at least one inputted image a set of separate and distinct representative images which depict the scene with one or more image parameters varying between images;
   compute a n-dimensional index hypervolume that maps n-dimensional coordinates to the representative image that exhibits a desired effect related to the varied parameter at a pixel location corresponding to the n-dimensional coordinates.

4. A computer-implemented process for creating an interactive image, comprising:
   an inputting step for inputting at least one digital image of a scene;
   a deriving step for deriving from the at least one inputted image a set of separate and distinct representative images which depict the scene with one or more image parameters varying between images;
   a computing step for computing a n-dimensional index hypervolume that maps n-dimensional coordinates to the representative image that exhibits a desired effect related to the varied parameter at a pixel location corresponding to the n-dimensional coordinates.

* * * * *